US006047941A

United States Patent [19]

Kulp et al.

[11] Patent Number: 6,047,941

[45] Date of Patent: *Apr. 11, 2000

[54] FLAG HOLDER

[75] Inventors: Jack H. Kulp, San Juan Capistrano, Calif.; John D. McKenney, Arroyo Seco, N.Mex.

[73] Assignee: Traffix Devices, Inc., San Clemente, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/564,662

[22] Filed: Nov. 29, 1995

[51] Int. Cl.[7] .......... A01K 97/01

[52] U.S. Cl. .......... 248/536; 248/219.3; 248/219.1; 40/612

[58] Field of Search .......... 248/218.4, 219.2, 248/219.3, 229.2, 473, 469, 539, 512, 536, 513, 534, 518, 519; 403/256–385, 391, 389; 40/612, 607, 610, 611; 116/173, 63 R, 63 P

[56] References Cited

U.S. PATENT DOCUMENTS

| | | | |
|---|---|---|---|
| 1,317,590 | 9/1919 | Obolewicz | 248/534 |
| 1,404,777 | 1/1922 | Leutner | 248/512 |
| 1,848,025 | 3/1932 | Raby | 40/607 |
| 4,019,271 | 4/1977 | Latimer | 40/125 H |
| 4,309,836 | 1/1982 | Knapp | 40/602 |
| 4,426,800 | 1/1984 | Brown | 40/606 |
| 4,433,935 | 2/1984 | Main et al. | 403/385 |
| 4,509,714 | 4/1985 | Seely | 248/618 |
| 4,592,158 | 6/1986 | Seely | 40/603 |
| 4,619,220 | 10/1986 | Seely et al. | 116/63 P |
| 4,650,146 | 3/1987 | Duke | 248/518 |
| 4,865,287 | 9/1989 | Stoudt | 248/513 |
| 4,980,984 | 1/1991 | Kulp et al. | 40/610 |
| 5,028,031 | 7/1991 | Stoudt | 40/612 |
| 5,152,091 | 10/1992 | Leach | 40/603 |
| 5,197,408 | 3/1993 | Stoudt | 116/173 |
| 5,197,819 | 3/1993 | Hughes | 404/13 |
| 5,267,523 | 12/1993 | Hugron | 116/63 R |
| 5,309,862 | 5/1994 | Lang | 116/173 |
| 5,540,007 | 7/1996 | Kulp | 40/612 |
| 5,624,092 | 4/1997 | Kulp | 248/219.3 |

*Primary Examiner*—Anita M. King
*Assistant Examiner*—Gwendolyn Baxter
*Attorney, Agent, or Firm*—Stout, Uxa, Buyan & Mullins, LLP; Donald E. Stout

[57] ABSTRACT

Flag holders that are simple in design and relatively inexpensive to manufacture are disclosed. These flag holders secure flag arms to reinforcing battens of highway signs without unnecessary bulk, weight, and complexity. A flag holder includes a flag arm bracket having a generally U-shaped body with two opposing edges. The U-shaped body wraps around a frame member, such as a reinforcing batten, of the highway sign, to thereby align the flag arm bracket with the frame member. An aperture in the flag arm bracket accommodates a shaft, such as a bolt. The shaft passes through both the aperture of the flag arm bracket and also through an aperture in the frame member of the highway sign. The bolt secures the flag arm bracket to the frame member. The flag arm bracket further includes an attachment portion for attaching at least one flag arm to the flag arm bracket.

22 Claims, 4 Drawing Sheets

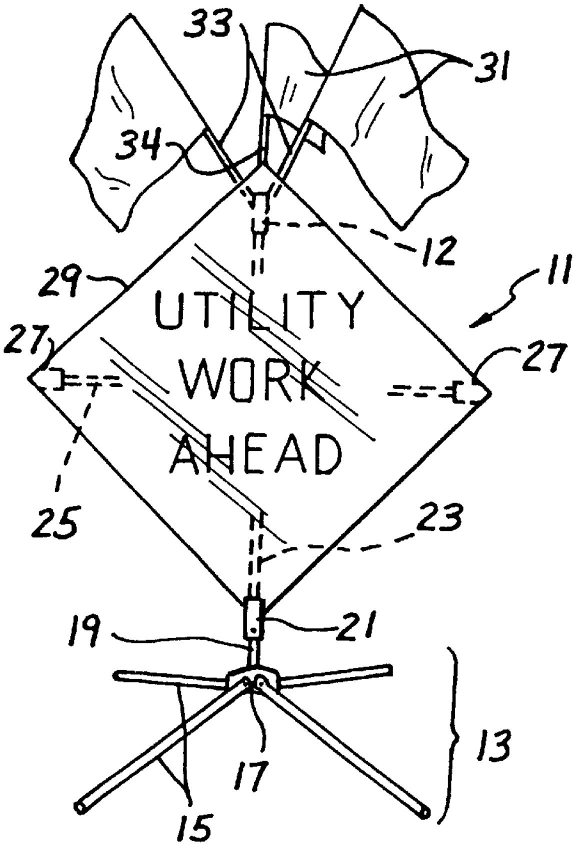
FIG. 1
FIG. 5
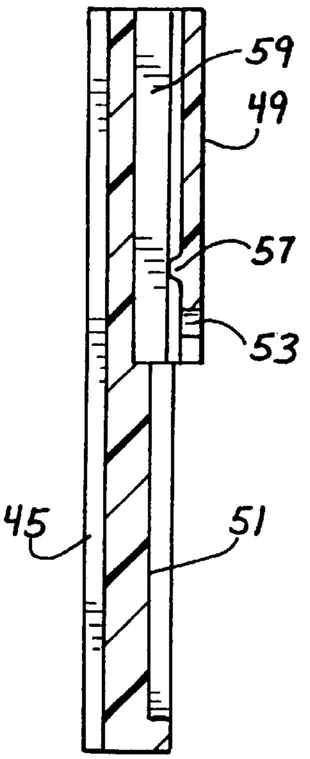
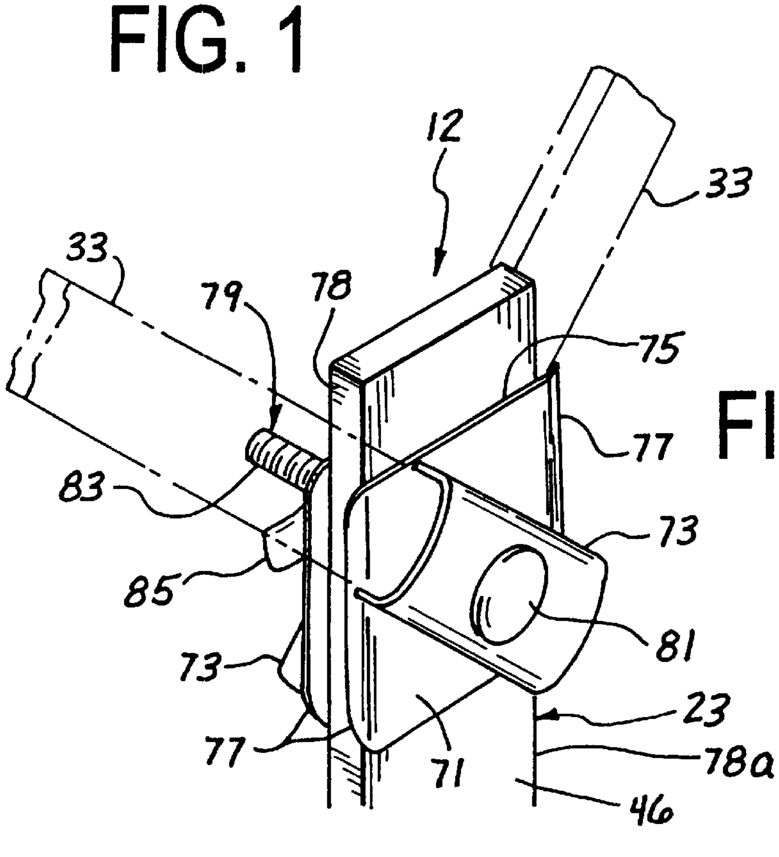
FIG. 8

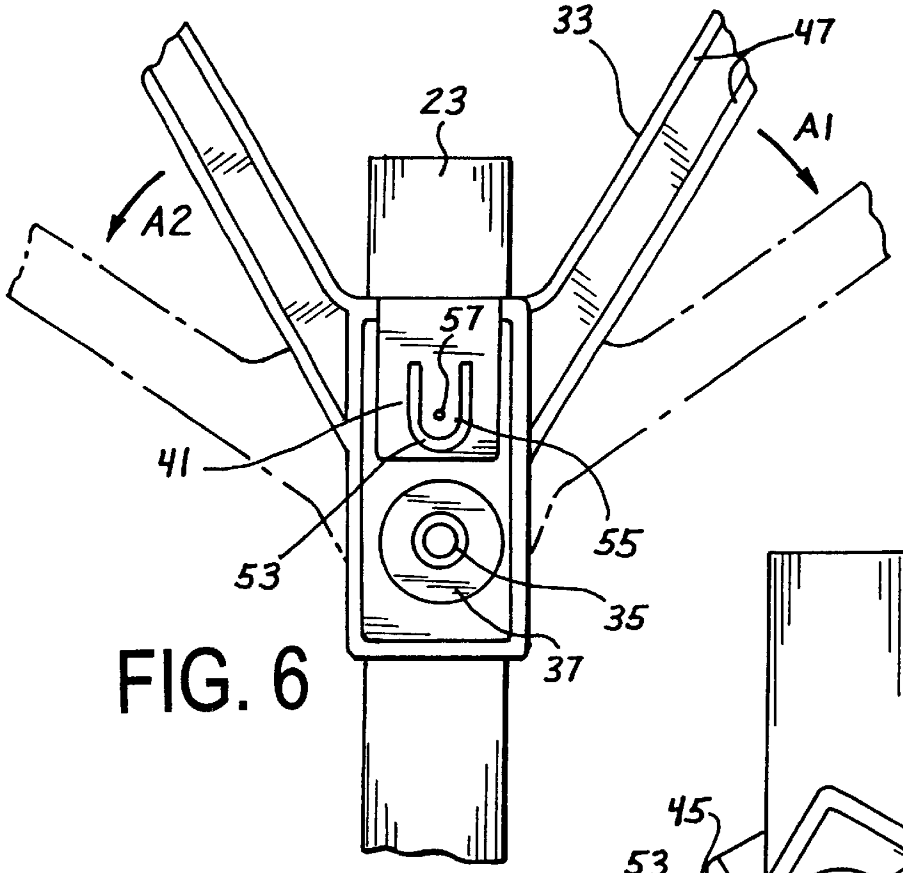
FIG. 6
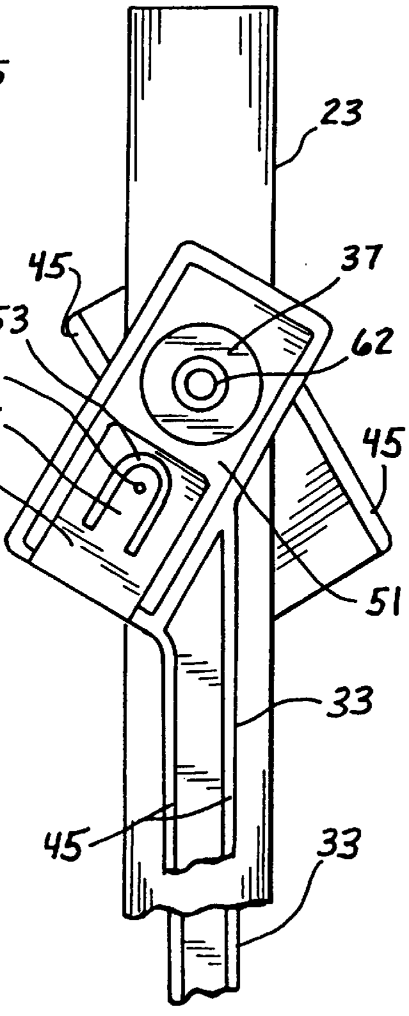
FIG. 7
FIG. 4
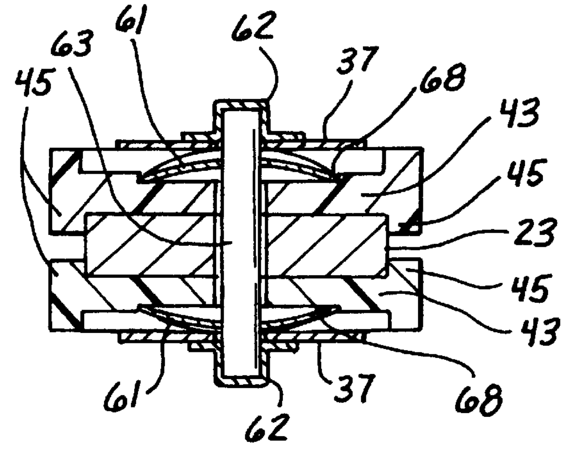

FLAG HOLDER

FIELD OF THE INVENTION

The present invention relates generally to highway signs and, more particularly, to assemblies for connecting warning flags to highway signs.

BACKGROUND OF THE INVENTION

Highway signs are generally used for promoting the safe passage of motor vehicles and/or pedestrians by advising of, for example, approaching unsafe driving conditions. These highway signs are generally provided with various highway legends, and are generally configured to flex in response to prevailing winds and wind gusts created by motor vehicles and the like.

Conventional highway signs are generally colored brightly to attract the attention of passersby. Additionally, these highway signs are commonly provided with warning flags secured thereto for flapping in the wind and for drawing additional attention of motorists to the legend on the highway sign.

A flexible, lightweight highway sign allows for convenient transportation and storage of the sign. Such a sign may have reinforcing battens for holding the sign in a message display position. These reinforcing battens are conventionally constructed of flexible, lightweight plastic materials. U.S. Pat. No. 4,426,800 discloses structure for mounting a highway sign using reinforcing battens and a stand. Warning flags are conventionally mounted on highway signs with flag arms, which are generally constructed of lightweight, flexible plastic. These warning flags enhance the visibility of the highway signs and give advance warning to motorists at a greater distance. U.S. Pat. No. 4,980,984 discloses a clamping member for attaching flag arms to a reinforcing batten of a highway sign. The clamping member disclosed in this patent, however, while providing excellent functionality, is somewhat complex in design and relatively expensive to manufacture. A need exists in the prior art for clamping members of simple, lightweight, and inexpensive design, for efficiently securing flag arms to highway signs.

SUMMARY OF THE INVENTION

The flag holders of the present invention are simple in design and relatively inexpensive to manufacture. These flag holders secure flag arms to reinforcing battens of highway signs without unnecessary bulk, weight, and complexity. According to one broad aspect of the present invention, a flag holder includes a flag arm bracket having a generally U-shaped body with two opposing edges. The U-shaped body wraps around a frame member, such as a reinforcing batten, of the highway sign, to thereby align the flag arm bracket with the frame member. An aperture in the flag arm bracket accommodates a shaft, such as a bolt. The shaft passes through both the aperture of the flag arm bracket and also through an aperture in the frame member of the highway sign. The bolt secures the flag arm bracket to the frame member. The flag arm bracket further includes an attachment portion for attaching at least one flag arm to the flag arm bracket.

The attachment portion of this flag arm bracket may include a sleeve for accommodating a corresponding flag arm. The bolt passes through the sleeve and through an aperture in the flag arm, to thereby prevent the flag arm from passing too far through the sleeve. The sleeve is oriented to hold the flag arm at either a thirty or forty-five degree angle, relative to the vertical reinforcing batten.

The attachment portion of the flag arm bracket may include the actual flag arm, instead of a sleeve. According to this broad aspect of the present invention, the flag arm is integrally molded with the flag arm bracket. This flag arm may be integrally formed with the flag arm bracket to extend at an angle of either thirty or forty-five degrees, relative to the vertical reinforcing batten. The flag arm bracket is secured to the vertical reinforcing batten using a shaft, for example, and the flag arm bracket may be rotated about the shaft to downwardly orientate the flag arm in a direction parallel to the vertical reinforcing batten for storage.

According to another broad aspect of the present invention, the flag arm bracket contacts a first side of the vertical reinforcing batten, and a second, similarly configured flag arm bracket may be mounted on an opposing side of the vertical reinforcing batten. The shaft, which passes through and secures the first flag arm bracket, also passes through and secures the second flag arm bracket. The second flag arm bracket holds a second flag arm in a similar orientation to the first flag arm, relative to the vertical reinforcing batten. A third flag arm may be optionally mounted in an aperture of either of the two flag arm brackets. This flag arm bracket assembly has a smaller number of moving parts, and allows for convenient storage, compared to the prior art. Additionally, the integrally molded flag arms may have I-beam configurations for added strength.

The present invention, together with additional features and advantages thereof, may best be understood by reference to the following description taken in connection with the accompanying illustrative drawings.

BRIEF DESCRIPTION OF THE DRAWINGS

FIG. 1 is a front elevational view of the flag arm bracket assembly of the present invention, securing three warning flags to a highway sign;

FIG. 4 is a first cross-sectional view of the flag arm bracket assembly shown in FIG. 2;

FIG. 5 is a second cross-sectional view of the flag arm bracket assembly shown in FIG. 2;

FIG. 6 is a front elevational view showing movement directions of the flag arm bracket assembly of the first preferred embodiment;

FIG. 7 is a front elevational view showing the flag arm bracket assembly of the first preferred embodiment in a storage configuration;

FIG. 8 is a perspective view of the flag arm bracket assembly according to a second preferred embodiment.

DETAILED DESCRIPTION OF THE PREFERRED EMBODIMENTS

Figure 2:
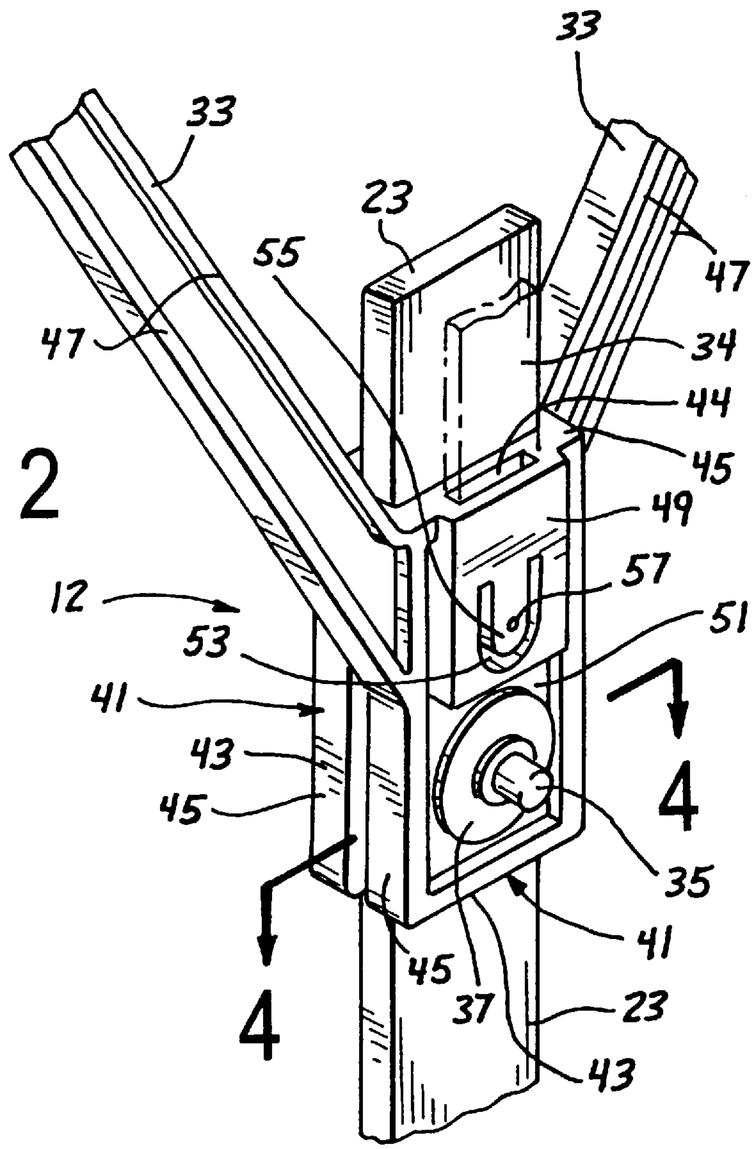
FIG. 2 is a perspective view illustrating the flag arm bracket assembly of a first preferred embodiment secured to a vertical reinforcing batten of the highway sign.

FIG. 1 shows the flag arm bracket assembly 12 of the present invention. The flag arm bracket assembly 12 is shown connected to a highway sign. Two side flag arms 33 and one center flag arm 34 are connected by the flag arm bracket assembly to the highway sign 11. Warning flags 31 are attached to each of the flag arms 33, 34.

The highway sign 11 comprises a sign stand 13 having legs 15, a base 17, and a stem 19. The sign stand 13 may be readily folded for transport and unfolded for mounting of the highway sign 11 thereon. In one preferred embodiment, the stem 19 of the sign stand 13 can be connected to the bottom pocket and connector 21 of the highway sign 11 to thereby mount the highway sign 11 in an upright configuration.

The highway sign 11 comprises a flexible material 29, which comprises a highway safety legend of a preselected type on one side thereof. A vertical reinforcing batten 23 fits into the bottom pocket and connector 21 at one end and into the flag arm bracket assembly 12 and a top pocket (not shown) at the other end thereof. A horizontal reinforcing batten 25 fits into two corner pockets 27 of the highway sign 11. The vertical reinforcing batten 23 and the horizontal reinforcing batten 25 preferably comprise a flexible material that will allow the highway sign 11 to respond to wind or gusts impinging thereon by bending, without breaking or tipping over. These reinforcing battens 23, 25 may comprise, for example, glass reinforced polyester, plastic pultrusions that are commercially available. The flexible material 29 of the highway sign 11 preferably comprises a lightweight, flexible material, such as reflective vinyl plastic and a fluorescent mesh that allows the sign to be readily rolled up, and in this condition, keeps the sign faces and legends in good working order.

FIG. 2 is a perspective view of one embodiment of the flag arm bracket assembly 12 attached to the vertical reinforcing batten 23. The flag arm bracket assembly 12 comprises two flag arm brackets 41, each of which includes a clamping portion 43 and a flag arm 33. Each clamping portion 43 is preferably integrally molded with a corresponding flag arm 33. As presently embodied, each integrally molded flag arm bracket 41 is injection molded, using a glass-filled plastic, for example. The flag arm 33 preferably comprises ribs 47. A warning flag 31 may be attached to each flag arm 33 either at manufacture, or by the user on site.

The clamping portion 43 of each flag arm bracket 41 is configured to snugly fit against the vertical reinforcing batten 23. In the presently preferred embodiment, the vertical reinforcing batten 23 has a rectangular cross section, and the clamping portion 43 comprises two lips 45 for fitting around a side 46 of the vertical reinforcing batten 23. The two lips 45 of each clamping portion 43 prevent the clamping portion 43 from rotating due to torque exerted by a corresponding flag arm 33, or from other forces such as wind.

In addition to having an integrally molded flag arm 33, the clamping portion 43 of the flag arm bracket 41 further comprises a rectangular aperture 44 for optionally receiving a rectangular center flag arm 34. The aperture 44 is partially disposed within a raised portion 49 of the clamping portion 43. This raised portion 49 has a U-shaped slot 53, which defines a finger member 55. The finger member 55 comprises an inwardly extending detent 57 thereon. No fasteners are utilized for securing the flag arm 34 within the rectangular aperture 44, since the flag arm and aperture are relatively sized to create a slightly interference fit, thereby frictionally securing the flag arm.

Figure 3:
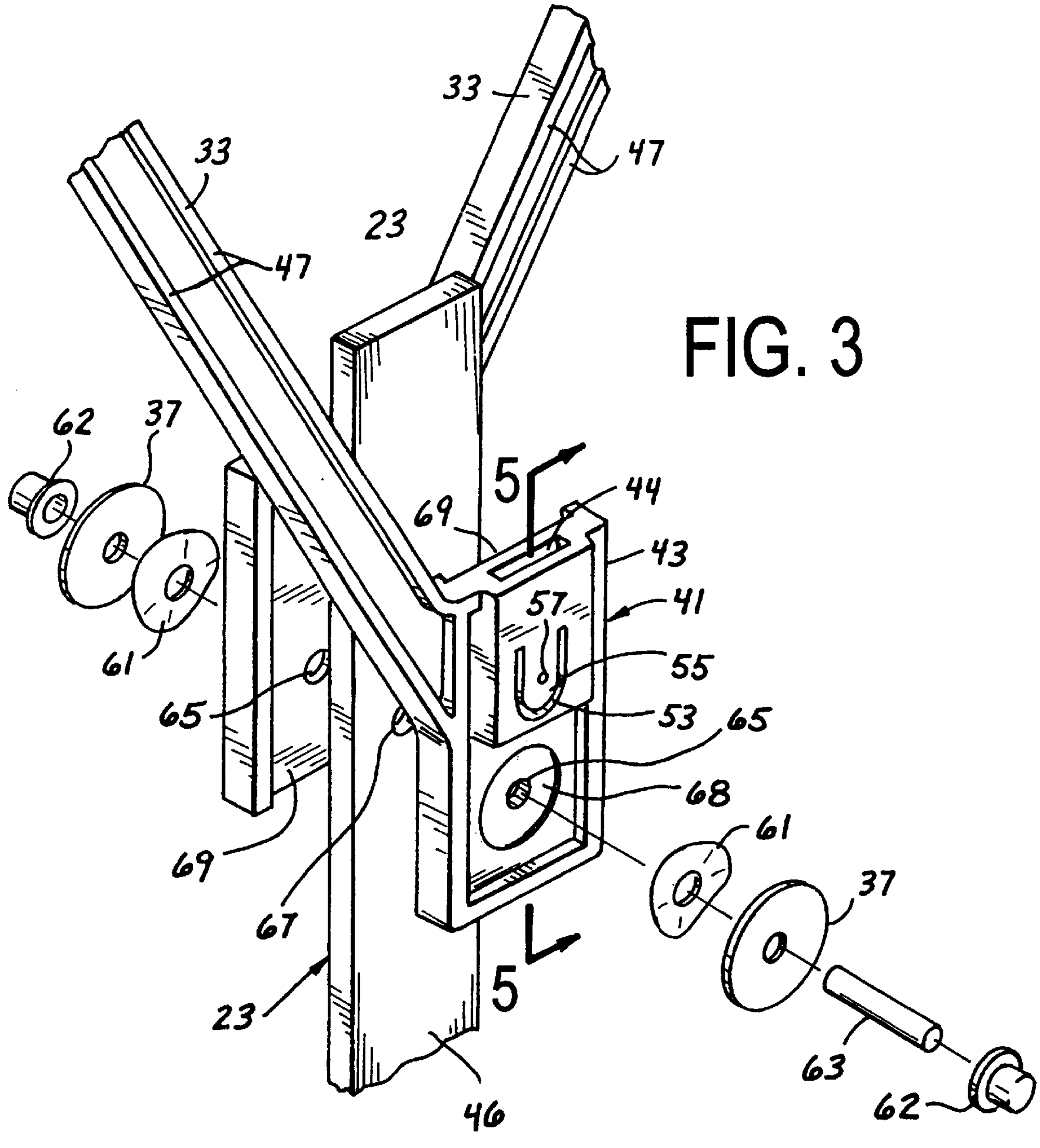
FIG. 3 is an exploded view of the flag arm bracket assembly shown in FIG. 2.

A recessed portion 51 of the clamping portion 43 includes an aperture 65 (FIG. 3). As shown in FIG. 3, the vertical reinforcing batten 23 also includes an aperture 67 for accommodating a shaft 63. The shaft 63 is inserted through a washer 37, a spring washer 61, the aperture 65 of the clamping portion 43, and the aperture 67 of the vertical reinforcing batten 23. Each side of the clamping portion 43 includes a recess 68 for receiving and centering the spring washer 61 (FIGS. 3 and 4). A push nut 62 fits over an end of the shaft 63, and the distal end of the shaft 63 can then be secured against a side of the vertical reinforcing batten 23 opposite the side 46 of the vertical reinforcing batten 23 contacting the clamping portion 43. For example, the shaft 63 may have threads on its distal end for accommodating a wing nut, or another push nut 62 may secure the shaft on the opposing side of the vertical reinforcing batten 23.

In the presently preferred embodiment, a second flag arm bracket 41, having a second aperture 65, fits against the opposing side of the vertical reinforcing batten 23. In this preferred embodiment, the shaft 63 is inserted through the second aperture 65 of the second flag arm bracket 41, and is also inserted through a corresponding spring washer 61, washer 37, and push nut 62.

A cross-sectional view of the flag arm bracket assembly 12, taken along the line 4—4 shown in FIG. 2, is illustrated in FIG. 4. The two spring washers 61 allow the two corresponding clamping portions 43 to move toward and away from the vertical reinforcing batten 23. When one of the spring washers 61 is compressed, a corresponding one of the clamping portions 43 may be slightly moved away from the surface of the vertical reinforcing batten 23. When the spring washer 61 is in a slightly expanded position, the two lips 45 of the corresponding clamping portion 43 fit around two corresponding sides of the vertical reinforcing batten 23 to thereby allow the inner channel 69 (FIG. 3) of the clamping portion 43 to contact three surfaces of the vertical reinforcing batten 23. In other words, when a flag arm bracket 41 is rotated about the shaft 63 into an orientation out of alignment with the vertical reinforcing batten 23, the corresponding spring washer 61 is slightly compressed. The spring washers 61, in combination with the lips 45 of the clamping portions 43, provide locking fits between the clamping portions 43 and vertical reinforcing batten 23. FIG. 5 illustrates a cross-sectional view of the clamping portion 43 shown in FIG. 3, taken along the line 5—5. As shown in FIG. 5, the inwardly extending detent 57 may slightly protrude into the rectangular aperture 44.

FIG. 6 illustrates the two flag arm brackets 41 in their locked positions, where the inner channels 69 of each clamping portion 43 (FIG. 3) contact an opposing surface of the vertical reinforcing batten 23. In the presently preferred embodiment, this locked position holds the respective flag arms 33 in a first working configuration at angles of either thirty or forty-five degrees, depending on preference, relative to the vertical reinforcing batten 23. The two flag arm brackets 41 may be rotated in the directions of arrows A1 and A2, respectively, to move the two flag arm brackets 41 into the position shown in FIG. 7. In FIG. 7, which illustrates a second working configuration for the flag arms, each of the flag arms 33 is parallel to the vertical reinforcing batten 23 to thereby allow for a compact storage of the vertical reinforcing batten 23, and the two flag arm brackets 41. In an alternative embodiment, the two flag arm brackets 41 may be secured to the vertical reinforcing batten 23 using nuts and bolts, for example. In this alternative embodiment, the two flag arm brackets 41 may or may not be separated from the vertical reinforcing batten 23 for storage.

FIG. 8 shows a flag arm bracket assembly 12 according to a second preferred embodiment. The flag arm bracket assembly 12 comprises two flag arm brackets 71 secured to opposite faces of the vertical reinforcing batten 23. Each flag arm bracket 71 comprises a flanged plate 75 and U-shaped member 73 attached thereto. As presently embodied, the flanged plate 75 and the U-shaped member 73 are metal, and the U-shaped member is welded to the flanged plate 75 at an angle that is either thirty degrees or forty-five degrees from the vertical reinforcing batten 23, depending upon the desired flag orientation angle. Each flanged plate 75 comprises two flanges 77 for fitting around opposing edges or sides 78, 78*a* of the vertical reinforcing batten 23. When the flanged plate 75 is secured to the vertical reinforcing batten 23, the flanged plate 75 contacts three adjacent surfaces of the vertical reinforcing batten 23. This snug fit prevents rotation of the flanged plate 75 when a flag arm 33 is secured between the flanged plate 75 and the U-shaped member 73.

Figure 9:
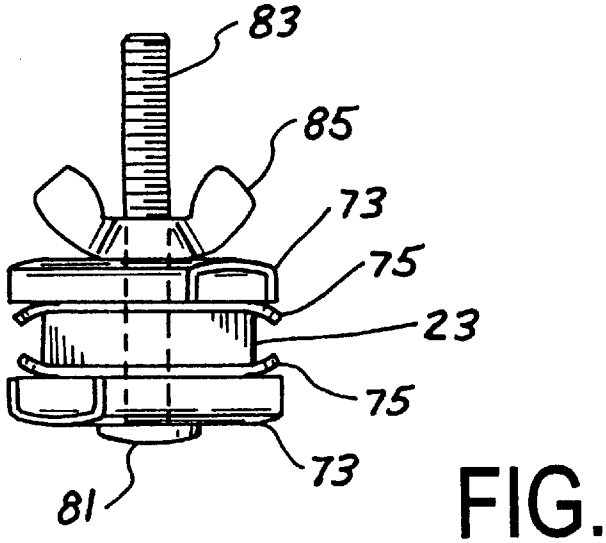
FIG. 9 is a top planar view of the flag arm bracket assembly shown in FIG. 8.

Each flag arm bracket 71 is firmly attached to the vertical reinforcing batten 23 using a single carriage bolt 79. The bolt passes through an aperture in each U-shaped member 73, and also through an aperture in the flanged plate 75. The bolt 79 also passes through an aperture in the vertical reinforcing batten 23, through apertures in a second flag arm bracket 71, and through apertures in the flag arms 33. A wing nut 85 is applied to the threaded portion 83 of the carriage bolt 79 to firmly secure the two flag arm brackets 71 onto opposing sides 46 and parallel edges 78, 78*a* of the vertical reinforcing batten 23. In addition to providing this securing function, the bolt 79 operates to prevent the flag arms 33 from completely passing too far through respective U-shaped members 73. A top view of the flag arm bracket assembly 12 shown in FIG. 8 is illustrated in FIG. 9. Although two flag arm brackets 71 are presently preferred, a single flag arm bracket 71 may be used to hold a single flag. In the presently preferred embodiment, the threaded portion 83 is slightly damaged or coated with an appropriate material, to prevent disengagement of the wing nut 85 from the bolt 79. The aperture in each U-shaped member 73 is preferably rectangular shaped, and a portion just beneath the bolt head 81 preferably has a matching rectangular shape. The rectangular shaped carriage bolt just beneath the bolt head 81 fits into the rectangular aperture of the U-shaped member 73, to thereby prevent rotation of the bolt 79 as the wing nut 85 is threaded onto the threaded portion 83.

Although exemplary embodiments of the invention have been shown and described, many other changes, modifications and substitutions, in addition to those set forth in the above paragraph, may be made by one having ordinary skill in the art without necessarily departing from the spirit and scope of this invention.

We claim:

1. A highway sign and assembly for securing a warning flag to said highway sign, comprising:

a single frame member;

a first clamping portion having a first aperture therein, said first clamping portion contacting a first side of the frame member;

a second clamping portion having a second aperture therein, said second clamping portion contacting a second opposing side of the frame member;

the first and second apertures in each of the first and second clamping portions being aligned with each other and with a third aperture in the frame member when the first and second clamping portions are disposed in clamping engagement with the frame member, the first and second apertures receiving a shaft portion therethrough, to thereby secure the first and second clamping portions in clamping engagement with the frame member; and an attachment portion for attaching a warning flag to one of the first and second clamping portions.

2. The highway sign according to claim 1, wherein the highway sign is comprised predominately of metal.

3. The highway sign according to claim 1, wherein the assembly is comprised predominately of molded plastic.

4. The highway sign according to claim 3, wherein the attachment portion is integrally molded with one of the first clamping portion and the second clamping portion.

5. A flag arm bracket for securing a flag arm to a highway sign, the highway sign including a portion having four adjacent surfaces, comprising:

a body having two opposing ends, and being adapted to wrap around and contact at least two but no more than three surfaces of the portion of the highway sign;

an aperture disposed in the body between the two opposing ends, the aperture being adapted for accommodating a shaft therethrough, to thereby secure the body to the highway sign;

the body further comprising a sleeve adapted for accommodating a flag arm therein; and an attachment portion for attaching at least one warning flag to the body.

6. The flag arm bracket according to claim 5, wherein the sleeve is adapted for accommodating a flag arm at an angle of either forty-five degrees or thirty degrees, relative to vertical line.

7. The flag arm bracket according to claim 5, wherein a second flag arm bracket can be secured to one of the four surfaces of the portion of the highway sign, in an opposing relationship to the first flag arm bracket, the second flag arm bracket being configured similarly to the first flag arm bracket and being secured to the highway sign with the shaft.

8. The flag arm bracket according to claim 5, wherein the attachment portion comprises a flag arm, which is adapted for accommodating a warning flag thereon.

9. The flag arm bracket according to claim 5, wherein the portion of the highway sign comprises a frame member.

10. The flag arm bracket according to claim 9, wherein the frame member comprises a reinforcing batten.

11. The flag arm bracket according to claim 10, wherein the reinforcing batten is oriented vertically.

12. The flag arm bracket according to claim 11, wherein the vertical reinforcing batten comprises said four surfaces, and wherein each of the two opposing ends of the body contacts a different one of the four surfaces of the vertical reinforcing batten.

13. The flag arm bracket according to claim 11, and further comprising an aperture in the vertical reinforcing batten, the aperture being adapted for accommodating the shaft therethrough.

14. The flag arm bracket according to claim 13, wherein the shaft is adapted to be secured to the vertical reinforcing batten.

15. An integrally molded plastic flag arm bracket adapted to be secured to a highway sign having at least a single frame member, the integrally molded flag arm bracket comprising:

a clamping portion for securing the integrally molded flag arm bracket to the frame member; and a warning flag arm for attaching at least one warning flag to the bracket, said warning flag arm being integrally molded to the clamping portion, and said clamping portion being adapted to secure the integrally molded flag arm bracket in one of a first working configuration where the warning flag is oriented to point substantially away from the highway sign and a second working configuration where the warning flag is oriented to be substantially parallel with the flag arm bracket.

16. The integrally molded flag arm bracket according to claim 15, wherein the clamping portion comprises an aperture for accommodating a shaft, the shaft securing the clamping portion to the frame member with a spring washer.

17. The integrally molded flag arm bracket according to claim 16, and further comprising a recess for maintaining alignment and centering the spring washer.

18. A flag arm bracket for securing a flag arm to a highway sign, the highway sign including a portion having four adjacent surfaces, comprising:

a body having two opposing ends, and being adapted to wrap around and contact at least two but no more than three surfaces of the portion of the highway sign;

an aperture disposed in the body between the two opposing ends, the aperture being adapted for accommodating a shaft therethrough, to thereby secure the body to the highway sign;

an attachment portion for attaching at least one warning flag to the body, the attachment portion comprising a flag arm which is adapted for accommodating a warning flag thereon a sleeve which is adapted for accommodating a flag arm therein.

19. The flag arm bracket according to claim 18, wherein a second flag arm bracket can be secured to one of the four surfaces of the portion of the highway sign, in an opposing relationship to the first flag arm bracket, the second flag arm bracket being configured similarly to the first flag arm bracket and being secured to the highway sign with the shaft.

20. A flag arm bracket for securing a flag arm to a highway sign, the highway sign including a vertically oriented reinforcing batten having four adjacent sides, comprising:

a body having two opposing ends, each of the two opposing ends of the body being adapted to contact a different one of the four sides of the vertical reinforcing batten;

an aperture disposed in the body between the two opposing ends, the aperture being adapted for accommodating a shaft therethrough, to thereby secure the body to the highway sign; and an attachment portion for attaching at least one warning flag to the body.

21. The flag arm bracket according to claim 20, wherein a portion of the body located between the two opposing ends contacts a third surface of the vertical reinforcing batten.

22. A highway sign comprising:

a frame member having at least two sides;

a first flag arm bracket secured to a first side of said frame member, said flag arm bracket comprising:

a generally U-shaped body having two opposing edges adapted to wrap around and contact the frame member to thereby align the body with the frame member, the body being adapted to contact the first side of the frame member; and an attachment portion for attaching at least one warning flag to the body, the attachment portion comprising a flag arm, which is adapted for accommodating a warning flag thereon;

a fastener for securing the body of the first flag arm bracket to the frame member; and a second flag arm bracket which is secured to a second side of the frame member, the second flag arm bracket being configured similarly to the first flag arm bracket.

* * * * *